United States Patent [19]

Kim

[11] Patent Number: 5,582,147
[45] Date of Patent: Dec. 10, 1996

[54] COMBUSTION CHAMBER FOR INTERNAL COMBUSTION ENGINE HAVING MULTIPLE VALVES

[75] Inventor: Yoonsuk Kim, Kyungki-do, Rep. of Korea

[73] Assignee: Hyundai Motor Company, Seoul, Rep. of Korea

[21] Appl. No.: 564,306

[22] PCT Filed: Mar. 22, 1995

[86] PCT No.: PCT/KR95/00024
§ 371 Date: Dec. 21, 1995
§ 102(e) Date: Dec. 21, 1995

[87] PCT Pub. No.: WO95/29328
PCT Pub. Date: Nov. 2, 1995

[30] Foreign Application Priority Data

Apr. 25, 1994 [KR] Rep. of Korea .................... 1994/8730

[51] Int. Cl.⁶ .............................. F02B 23/08; F02B 23/00
[52] U.S. Cl. .............................. 123/302; 123/661
[58] Field of Search ..................... 123/302, 661, 123/193.5, 193.3

[56] References Cited

U.S. PATENT DOCUMENTS 4,763,622  8/1988  Indra et al. .................. 123/661
4,972,814  11/1990  Matsuki et al. .............. 123/661
5,207,210  5/1993  Yamagata et al. ............ 123/661

FOREIGN PATENT DOCUMENTS 1232327  10/1986  Japan .......................... 123/661

Primary Examiner—Marguerite McMahon
Attorney, Agent, or Firm—Birch, Stewart, Kolasch & Birch, LLP

[57] ABSTRACT

The present invention is directed to a combustion chamber configuration which can enhance an engine output by reducing a combustion time. The combustion chamber for an internal combustion engine having multiple valve, including a cylinder block, a piston reciprocating in said cylinder block, a cylinder head defining the combustion chamber with said cylinder block and said piston, a roof defined on a bottom plan of the cylinder head; first, second, third and fourth quadrants which are defined on said roof by ordinate and abscissa axes which pass through a central portion of the combustion chamber, a sparking plug mounting hole formed on the first quadrant, an exhaust port formed on the second quadrant, a first intake port formed on the third quadrant, a second intake port formed on the fourth quadrant, a first squish area formed over the third and fourth quadrants, and a second squish area formed over the first and second quadrants.

11 Claims, 5 Drawing Sheets

COMBUSTION CHAMBER FOR INTERNAL COMBUSTION ENGINE HAVING MULTIPLE VALVES

BACKGROUND OF THE INVENTION

1. Field of the Invention

The present invention relates to a combustion chamber for an internal combustion engine and, more particularly, to a combustion chamber configuration which can enhance engine output by reducing a combustion time.

2. Description of Related Art

In general, many schemes of a combustion chamber configuration have been proposed to increase engine output.

Since the engine output depends on a combustion state of the engine, a combustion chamber should be configured such that a distance of flame propagation can be shortened to accomplish fast burn, thereby increasing compression ratio and enabling ignition advancement.

To shorten the distance of the flame propagation, it is desirable to make the combustion chamber compact. Therefore, to make the combustion chamber compact, it is preferable to change the configuration of the bottom surface of a cylinder head which defines the combustion chamber with a cylinder block and a piston head.

That is, it is desirable to design the bottom surface of the cylinder head to give rise tea squish flow. It is also desirable to properly change the position of an ignition plug in accordance with design of the combustion chamber.

However, although the configuration of the combustion chamber has an effect on engine output, thermal efficiency, exhaust gas, and the like, it is impossible to obtain good characteristic in the all aspects. Accordingly, the configuration of the combustion chamber is to be designed in accordance with a design purpose or a type of the engine.

If an element which disturbs the flow of the gases exists in the engine, powerful turbulence cannot be generated such that the combustion ratio is deteriorated.

SUMMARY OF THE INVENTION

It is an object of the invention to provide a combustion chamber for an internal combustion engine having multiple valves which can shorten the distance of flame propagation and generate the powerful turbulence such that the combustion time can be reduced.

To achieve the above object, the present invention provides a combustion chamber for an internal combustion engine having multiple valve, comprising: a cylinder block; a piston reciprocating in said cylinder block; a cylinder head defining the combustion chamber with said cylinder block and said piston; a roof defined on a bottom surface of the cylinder head; first, second, third and fourth quadrants which are defined on said roof by ordinate and abscissa axes which pass through a center point of the roof; a sparking plug mounting hole formed on the first quadrant; an exhaust port formed on the second quadrant; a first intake port formed on the third quadrant; a second intake port formed on the fourth quadrant; a first squish area formed over the third and fourth quadrants; and a second squish area formed over the first and second quadrants.

BRIEF DESCRIPTION OF THE INVENTION

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENT

Figure 1:
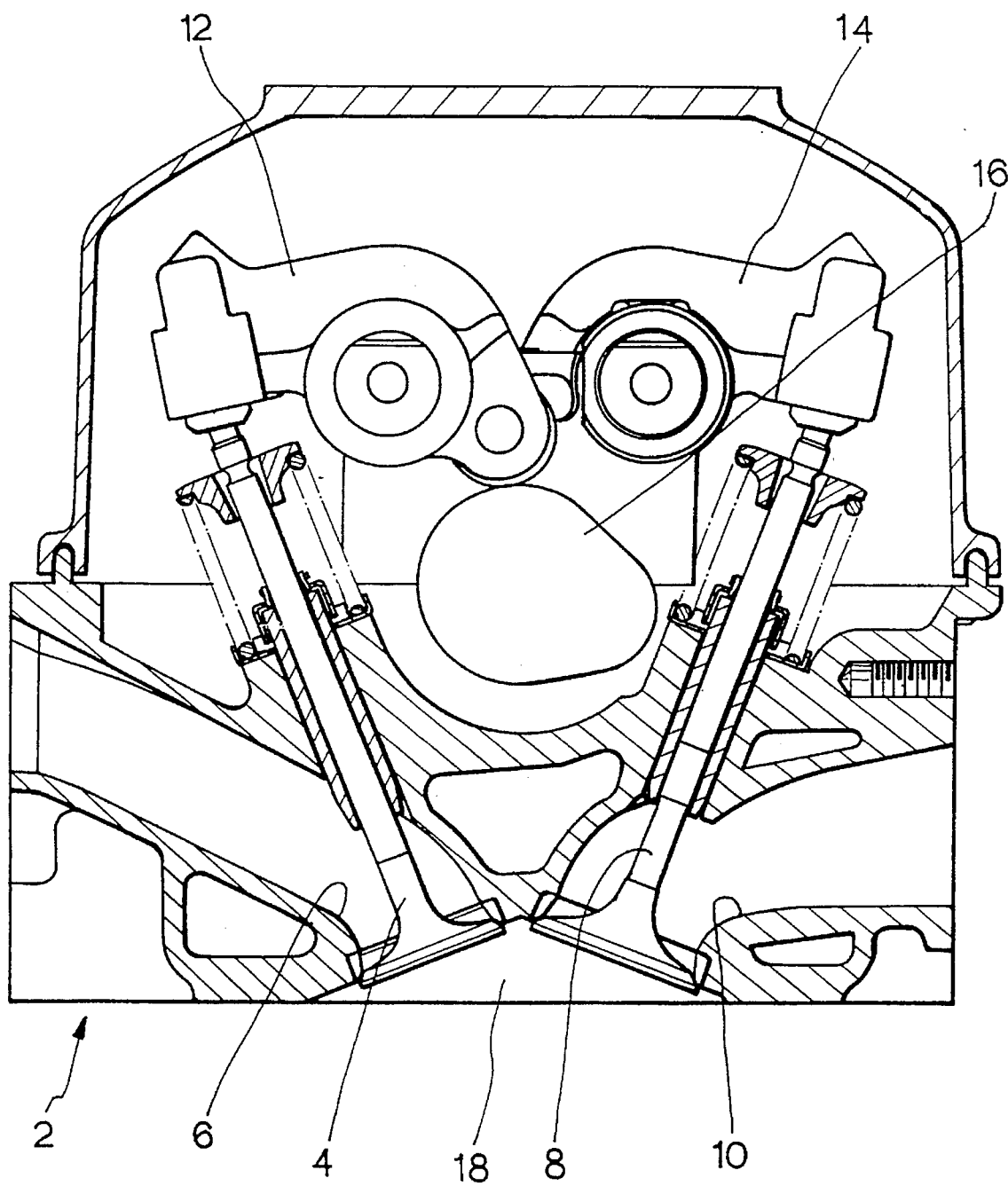
FIG. 1 is a sectional view showing a cylinder head of an internal combustion engine to which a combustion chamber according to the present invention can be adapted.

Referring to FIG. 1, a cylinder head 2 includes an intake port 6 which opens and closes by an intake valve 4 and an exhaust port 10 which opens and closes by an exhaust valve 8. The valves 4 and 8 are operated by a valve operating means including a pair of rocker arms 12 and 14 and a cam shaft 16.

The cylinder head 2 defines a combustion chamber 18 with the cylinder block(not shown) and a piston(not shown) which reciprocates in a cylinder bore formed on the cylinder block.

Accordingly, the bottom surface of the cylinder head 2 is to be a roof of the combustion chamber. The roof is configured such that its center portion is located farthest from a base plane of the cylinder head 2 and its periphery is located closest to the base plane surface of the cylinder head 2.

However, since the roof of the combustion chamber 18 has a great effect on the flow of the fuel-air mixture, in this embodiment, multiple squish areas are provided to form powerful turbulence without resistance against the flow of the mixture.

Figure 2:
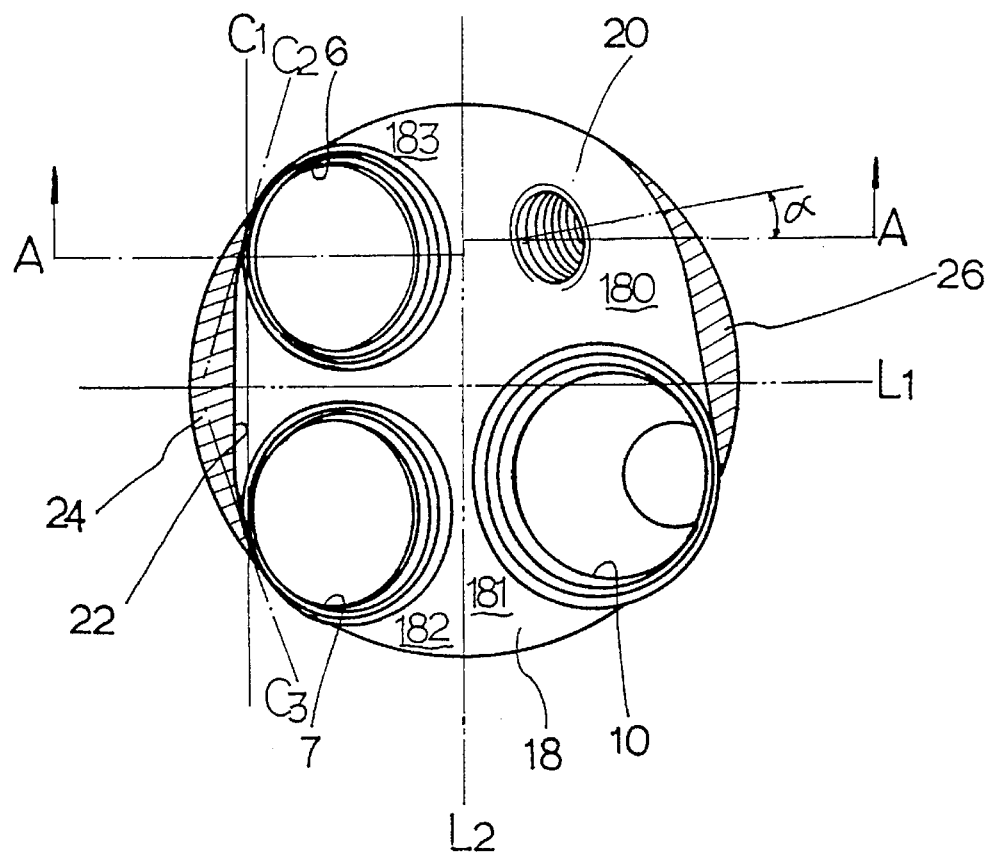
FIG. 2 is a bottom plan view of the cylinder head of FIG. 1 where a roof of a combustion chamber according to a first embodiment of the present invention is shown.

As shown in FIG. 2 which illustrates the combustion chamber 18 according to a first embodiment of the present invention, the roof of the combustion chamber according to a first embodiment of the present invention is a combustion chamber roof of a three-valve type engine which comprises two intake ports 6 and 7 and one exhaust port 10. When dividing the combustion chamber 18 into four quadrants 180, 181, 182 and 183 of a circle defined by the diameter of the cylinder on the basis of abscissa and ordinate axes L1 and L2 which pass the center of the base plane of the cylinder head 2, a hole 20 through which a sparking plug is mounted is formed on a first quadrant 180, the exhaust port 10 is formed on a second quadrant 181, the intake port 7 is formed on a third quadrant 182, and the other intake port 6 is formed on a fourth quadrant 183. The center of the base plane of the cylinder head is coincident with the central axis of the cylinder.

Squish areas are provided on a periphery of the combustion chamber. That is, a first squish area 24 is defined by a circumference of the third and fourth quadrants 182 and 183 with a tangent line C2 of the intake port 6, a tangent line C3 of the intake port 7, and a straight side edge line 22 which connects the tangent lines C2 and C3 each other. Further, a second squish area 26 is formed on a circumference of the first and second quadrants between the sparking plug mounting hole 20 and the exhaust port 10.

The straight side edge line 22 is provided at more outer side than an outer common tangent line C of the intake ports 6,7.

The first and second squish areas 24 and 26 as described above make the combustion chamber 18 compact such that the flame propagation can be shortened. Further, the surface area of the combustion chamber 18 can be reduced as compared with the volume of the combustion chamber 18, thereby reducing the heat loss.

The sparking plug mounting hole 20 has an angle α with respect to the abscissas axis L1. The angle α is in a range from 1 degree to 3 degrees with respect to the abscissas axis L1.

Reason for selection of the above angle is to form the rich mixed gas around the sparking plug even if the central portion of the sparking plug mounting hole is disposed more outwardly than that of the intake port 6. This enables a lean combustion and reduces combustion time.

Further, the central portion of the sparking plug mounting hole 20 is distant away from the ordinate axis L2. The distance from the central portion of the hole 20 to the ordinate axis L2 is shorter than a distance from the central portion of the exhaust port 10 to the ordinate axis L2.

Figure 3:
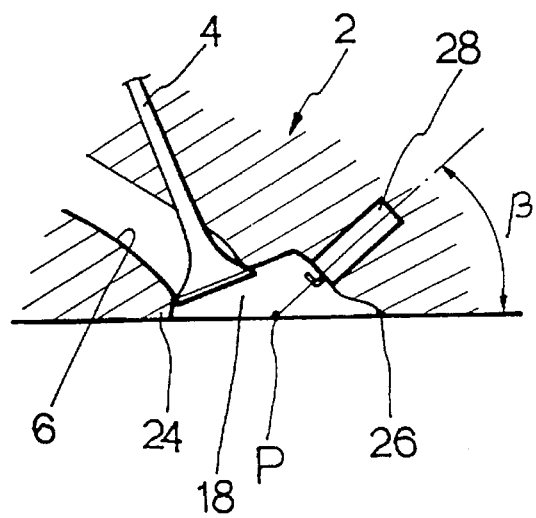
FIG. 3 is a sectional view taken alone the line A—A of FIG. 2.

Referring to FIG. 3, The combustion chamber is provided with the first and second squish areas 24 and 26 such that the surface area of the combustion chamber 18 can be reduced as compared with the volume of the combustion chamber 18.

Further, the sparking plug 28 mounted on the cylinder head 2 is inclined such that an inclined angle β with respect to the base plane of the cylinder head is in a range from 40 degrees to 50 degrees, and the axis of the cylinder and the longitudinal axis of the sparking plug 28 intersects on the base plan, that is, the extension line of the longitudinal axis of the sparking plug 28 passes the center of the base plane circle defined by the diameter of the cylinder.

Figure 4:
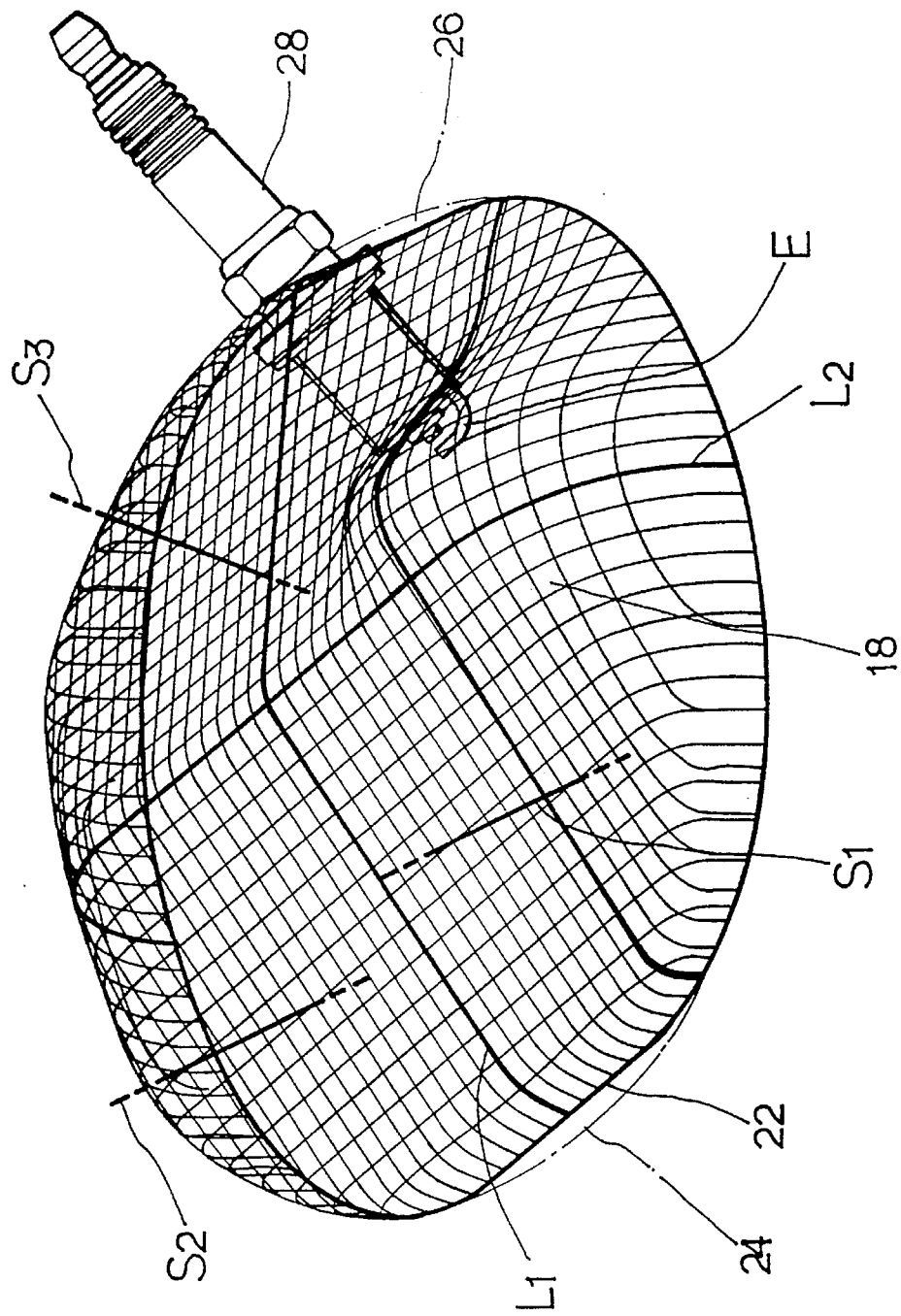
FIG. 4 is a three dimensional view showing the roof of the combustion chamber according to the first embodiment of the present invention.

Referring to FIG. 4 which illustrates the combustion chamber according to the first embodiment in three-dimension, a first imaginary axis S1 indicates the longitudinal axis of the intake valve 4 which opens and closes the intake port 6 and a second imaginary axis S2 indicates the longitudinal axis of the other intake valve which opens and closes the intake port 7.

Further, the third imaginary axis S3 indicates the longitudinal axis of the exhaust valve 8 which opens and closes the exhaust port 10. The inclined angle of the sparking plug with respect to the base plane of the cylinder head is less than those of each imaginary axis S1, S2 and S3 with respect to the base plane of the cylinder. Also there can be seen an electrode E of the sparking plug 28 which is disposed toward the central portion of the combustion chamber.

Accordingly, since it is possible to make the combustion chamber compact, the distance of the flame propagation can be shortened during combustion, and since the internal wall of the combustion chamber can be configured in a round configuration, the surface area of the combustion chamber can be reduced compared to the volume thereof such that the heat loss and HC can be reduced. Further, a powerful turbulence can be generated without disturbance of the flow of the mixture, the combustion can be quickly accomplished.

Particularly, since the sparking plug 28 is mounted to be surrounded with smooth curvature, the heat loss can be reduced and the free sparking of degree can be increased.

Figure 5:
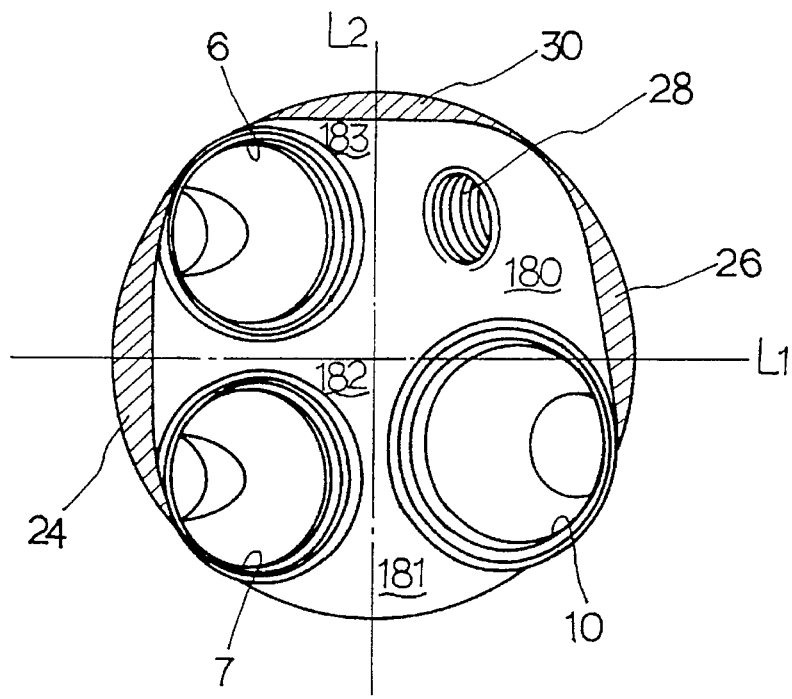
FIG. 5 is a view showing a roof of a combustion chamber according to a second embodiment of the present invention.

FIG. 5 shows a combustion chamber in accordance with a second embodiment of the present invention. A third squish area 30 is further provided over the first and fourth quadrants 180 and 183.

Since the combustion chamber according to the second embodiment has a structure which further surrounds the sparking plug 28, the heat loss can be more reduced than the combustion chamber described in the first embodiment.

Figure 6:
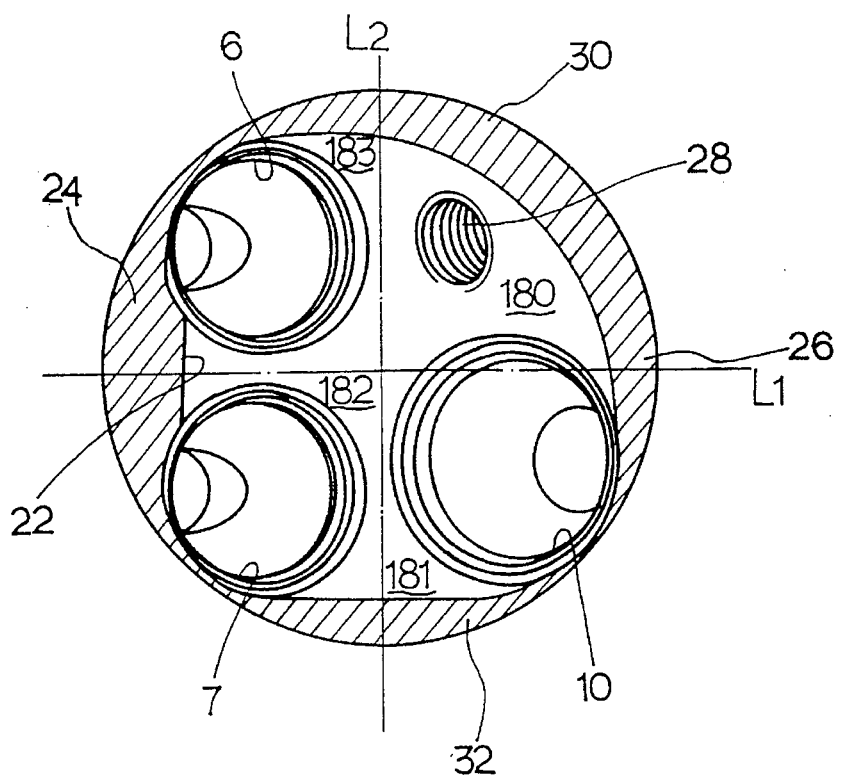
FIG. 6 is a view showing a roof of a combustion chamber according to a third embodiment of the present invention.

FIG. 6 shows a combustion chamber in accordance with a third embodiment of the present invention. The straight line 22 of the first squish area 24 is disposed more inwardly than the common tangent line C of the intake ports 6 and 7 and a fourth squish area 32 is further provided on an opposite side of the third squish area 30.

Further, the third squish area 30 is connected with the second squish area 26 with a large curvature compared with that of the second embodiment. This structure has advantages that the neat loss can be more reduced and the combustion chamber can also be made more compact with the more rounded configuration.

Figure 7:
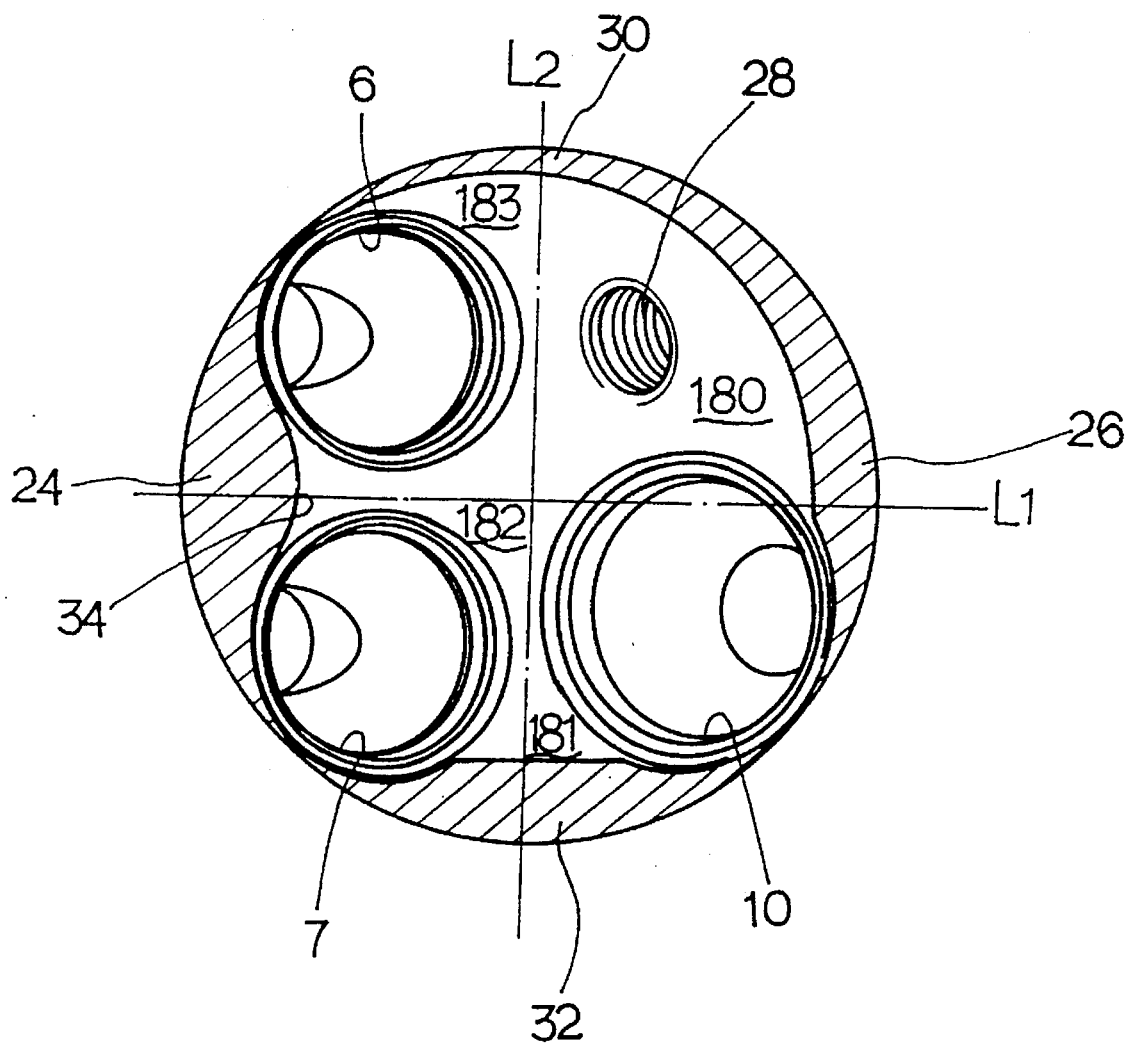
FIG. 7 is a view showing a roof of a combustion chamber according to a fourth embodiment of the present invention.

FIG. 7 shows a combustion chamber in accordance with a fourth embodiment of the present invention. The first squish area 24 has a protrusion 34 extending toward the inside of the combustion chamber 18 while the first squish area of the first, second and third embodiments is formed in the straight line.

This configuration makes the combustion chamber more round which is good in generating the turbulence.

What is claimed is:

1. A combustion chamber for an internal combustion engine having multiple valve, comprising:

a cylinder block;

a piston reciprocating in said cylinder block;

a cylinder head defining the combustion chamber with said cylinder block and said piston;

a roof defined on a bottom plan of the cylinder head;

first, second, third and fourth quadrants which are defined on said roof by ordinate and abscissa axes which pass through a central portion of the combustion chamber;

a sparking plug mounting hole formed on the first quadrant;

an exhaust port formed on the second quadrant;

a first intake port formed on the third quadrant;

a second intake port formed on the fourth quadrant;

a first squish area formed over the third and fourth quadrants; and a second squish area formed over the first and second quadrants.

2. The combustion chamber according to claim 1, wherein said first squish area is formed outwardly relative to an outer common tangent line of the first and second intake port.

3. The combustion chamber according to claim 1, wherein said sparking plug mounting hole is inclined in a range from 1 degree to 3 degrees with respect to the abscissa axis.

4. The combustion chamber according to claim 1, wherein said sparking plug mounting hole is inclined such that along, longitudinal axis of the sparking plug and a central axis of the combustion chamber can intersect with each other on the bottom plan of the cylinder block.

5. The combustion chamber according to claim 1, wherein said combustion chamber is further provided with a third squish area between the first and second squish areas over the first and fourth quadrants such that the sparking plug can be surrounded.

6. The combustion chamber according to claim 1, wherein said combustion chamber is further provided with a fourth squish area between the first and second squish areas over the second and third quadrants.

7. The combustion chamber according to claim 1, wherein said first squish area is provided outwardly relative to a common tangent line of outer sides of each intake ports.

8. The combustion chamber according to claim 1, wherein a portion of the first squish area facing the combustion chamber is a straight line.

9. The combustion chamber according to claim 1, wherein a portion of the first squish area facing the combustion chamber is a curvature.

10. The combustion chamber according to claim 6, wherein the fourth squish area is provided inwardly relative to an outer common tangent line of the intake port and the exhaust port.

11. The combustion chamber according to claim 1, wherein a center of the sparking plug mounting hole is nearer to the center of the combustion chamber than a center of the exit port.

* * * * *